United States Patent
Krishnamurthy (10) Patent No.: US 9,736,068 B2
(45) Date of Patent: Aug. 15, 2017

(54) SWITCHING LAYER 2 (L2) FLOWS TO A CORRECT NODE IN A LINK AGGREGATION DOMAIN

(71) Applicant: DELL PRODUCTS L.P., Round Rock, TX (US)

(72) Inventor: Karthik Krishnamurthy, Chennai (IN)

(73) Assignee: DELL PRODUCTS LP, Round Rock, TX (US)

( * ) Notice: Subject to any disclaimer, the term of this patent is extended or adjusted under 35 U.S.C. 154(b) by 131 days.

(21) Appl. No.: 14/599,102

(22) Filed: Jan. 16, 2015

(65) Prior Publication Data
US 2016/0212041 A1    Jul. 21, 2016

(51) Int. Cl.
*H04L 12/721* (2013.01)
*H04L 12/46* (2006.01)
*H04L 12/709* (2013.01)

(52) U.S. Cl.
CPC .......... *H04L 45/66* (2013.01); *H04L 12/4641* (2013.01); *H04L 45/245* (2013.01)

(58) Field of Classification Search
None
See application file for complete search history.

(56) References Cited

U.S. PATENT DOCUMENTS

| | | | |
|---|---|---|---|
| 9,014,011 B2 | 4/2015 | Natarajan | |
| 9,154,408 B2 | 10/2015 | Mahadevan | |
| 2012/0275297 A1* | 11/2012 | Subramanian | ........ H04L 45/245 370/225 |
| 2014/0133486 A1 | 5/2014 | Sivasankar | |
| 2014/0219081 A1 | 8/2014 | Natarajan et al. | |
| 2014/0241146 A1 | 8/2014 | Mahadevan et al. | |
| 2014/0247829 A1* | 9/2014 | Gautam | .............. H04L 29/0653 370/392 |
| 2015/0026345 A1* | 1/2015 | Ravinoothala | ........ H04L 47/125 709/226 |

* cited by examiner

*Primary Examiner* — Anh Ngoc Nguyen
(74) *Attorney, Agent, or Firm* — North Weber & Baugh LLP (57) ABSTRACT

Embodiments of the present invention include systems and methods for providing more efficient switching of data traffic in networks that include a link aggregation domain. In embodiments, when packets arrive at one virtual link trunking (VLT) unit via an inter-node link (INL) from a peer VLT unit in the VLT domain, the first VLT unit checks whether the Media Access Control source address (MAC SA) was learned on a VLT LAG. If the MAC SA was learned on a VLT LAG, then, in embodiments, a special packet is sent to a VLT termination unit to have it learn the MAC destination address of the original packet on a sub-LAG from which the special packet was received. Learning the MAC destination address on the sub-LAG rather than the parent LAG allows for more direct switching of future packets.

20 Claims, 8 Drawing Sheets

SWITCHING LAYER 2 (L2) FLOWS TO A CORRECT NODE IN A LINK AGGREGATION DOMAIN

TECHNICAL FIELD

The present invention relates to networking and networking devices, more particularly, to systems and methods for improving the exchange of information between information handling systems.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Ever increasing demands for data have driven networks to provide more throughput. Not only must networks be reliable, but they must also provide adequate bandwidth. Thus, a key area in which networks strive to improve is in increasing capacity (data throughput or bandwidth).

One way to increase capacity involves the use of a link aggregation group (LAG). Link aggregation refers to various methods of aggregating network connections to increase data throughput while still supporting fault tolerance in case of failures. Generally, link aggregation involves grouping two or more physical data network links between two network devices into one logical link in which the two or more physical network links may be treated as a single logical link. By using certain link aggregation implementations, the need for spanning tree protocol may be eliminated by increasing the intelligence of network forwarding devices, providing a non-blocking high performance network.

Initial implementation of link aggregation required that the aggregated links terminate on a single switch. However, additional implementation allow the links to terminate on two switches. An example of a mechanism used to support LAG networking across more than one device is multi-chassis link aggregation ("MLAG") and distributed resilient network interconnect (DRNI) [IEEE P802.1AX-REV], which is incorporated by reference herein in its entirety.

MLAG is a LAG implementation in which a LAG terminates on two separate chassis or devices. A MLAG is configured such that one or more links comprising one LAG terminate at ports on a first device and one or more links comprising the same LAG terminate on a second device. The first and second devices are configured so that they appear to the surrounding network to be one logical device. At least one standard for link aggregation has been promulgated by the Institute of Electrical and Electronic Engineers, which is contained in the IEEE 802.1AX-2008 standard, which is incorporated by reference herein. However, a number of different vendors have implemented their own versions. For example, Cisco markets EtherChannel and Port Aggregation Protocol (along with its related Virtual Switching System (VSS), virtual PortChannel (vPC), Multichassis EtherChannel (MEC), and Multichassis Link Aggregation (MLAG)). Dell Force 10 markets Virtual Link Trunking (VLT). Avaya markets Multi-Link Trunking (MLT), Split Multi-Link Trunking (SMLT), Routed Split Multi-Link Trunking (RSMLT), and Distributed Split Multi-Link Trunking (DSMLT). ZTE markets "Smartgroup" and Huawei markets "EtherTrunks." Other vendors provide similar offerings. A standard for this technology is under development in the IEEE 802.1 standards committee; the project is called distributed resilient network interconnect (DRNI).

As noted, the two switches may be configured to appear as a single logical switch. Multi-chassis link aggregation implementation provide special links that can be used to connect two separate switches together to form an aggregation switch that in some ways acts like a single larger chassis. These special connections also are called by various names, such as inter-chassis links (ICLs) or inter-node links (INLs). With two chassis aggregated in this manner, when a packet arrives at one of the switches that must egress on the other switch, the first switch forwards the packet to a port associated with the special link interconnect where it is transmitted to the other device for transmission over the network.

It must be noted, however, carrying data traffic on the ICLs provides limitations as these links are not intended to carry much data traffic. It is preferable to keep as much data traffic off the ICLs as possible. However, in current implementations, there are situations when data gets switched onto an ICL. Consider the situation presented in FIG. 1.

Figure 1:
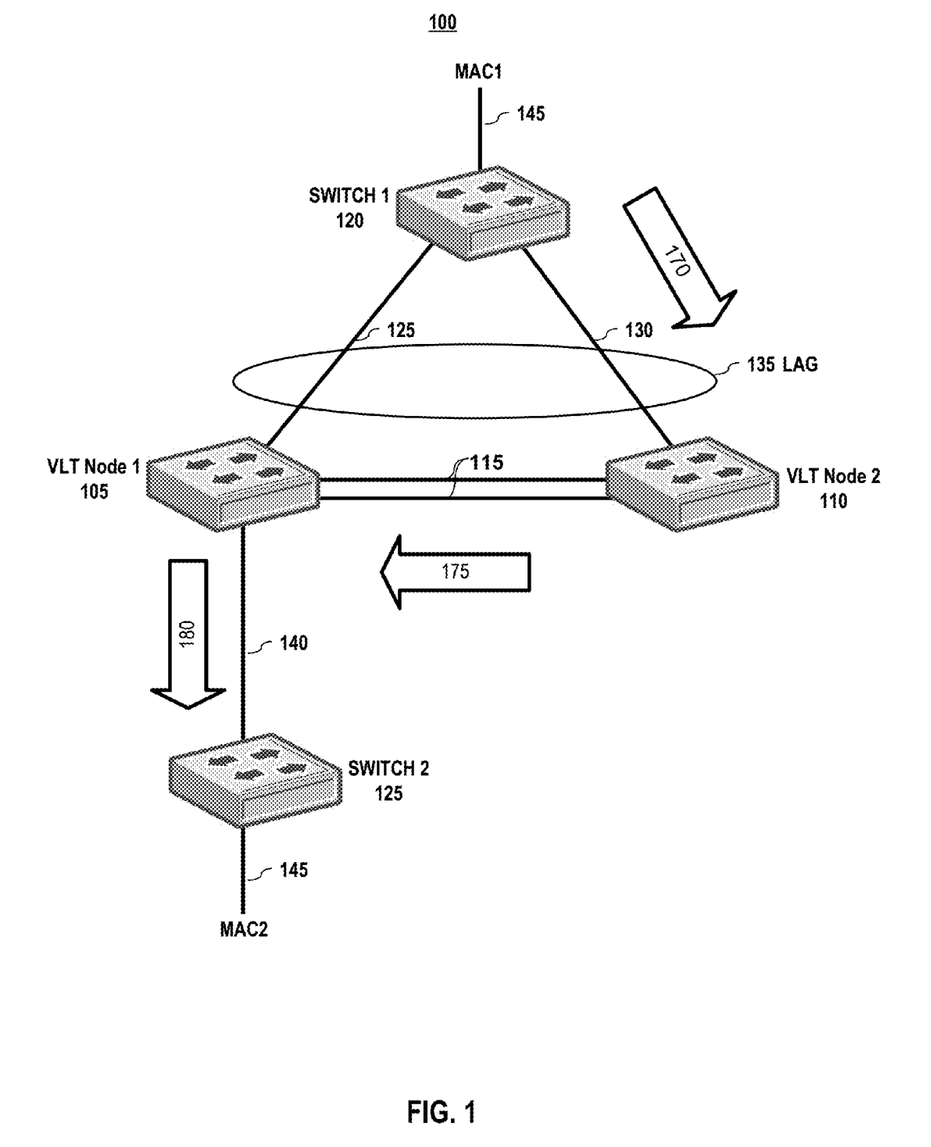

FIG. 1 depicts an internetworking of devices that includes a virtual link trunking (VLT) domain. The VLT domain includes VLT Node 1 105 and VLT Node 2 110 connected by a set of inter-node links 115. The two nodes form a VLT LAG 135 with Switch 1 120, and Switch 2 125 is connected directly to VLT Node 1 105. Assume that there are bidirectional layer 2 (L2) flows between Switch 1 and Switch 2. Switch 1 would learn the L2flow on LAG 135 at ingress. When Switch 1 forwards the packets to Switch 2 on the LAG 135, the packets (170) may go to Node 2 based on hardware-based LAG hashing. Node 2 then forwards the packets (175) over the INL to Node 1 which in turn forwards (180) to Switch 2. This could cause congestion on the INL 115 and also adds an extra hop in the path, which is not optimal. It should be noted that the same or similar problem may occur in different configurations. For example, the same problem exists when there are L2bidirectional flows between two VLT LAGs and all the links between one of the VLT LAGs and one of the VLT nodes becomes non-operational.

Accordingly, what is needed are systems and methods to achieve more efficiency switching of traffic in networks with a VLT domain.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

Figure ("FIG.") 1 depicts an internetworking of devices that includes a virtual link trunking domain.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components may be implemented in software, hardware, or a combination thereof.

Furthermore, connections between components, routers, switches, or nodes within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "packet," "datagram," "segment," or "frame" shall be understood to mean a group of bits that can be transported across a network. These terms shall not be interpreted as limiting embodiments of the present invention to particular layers (e.g., Layer 2 networks, Layer 3 networks, etc.); and, these terms along with similar terms such as "data," "data traffic," "information," "cell," etc. may be replaced by other terminologies referring to a group of bits, and may be used interchangeably.

Embodiments of the present invention presented herein will be described using virtual link trunking (VLT), link aggregation, multipathing, distributed resilient network interconnect or other similar terminology. These examples and terms are provided by way of illustration and not by way of limitation. One skilled in the art shall also recognize the general applicability of the present inventions to other applications and to other similar technologies that are called by different names, some of which were discussed above in the "Background" section. Accordingly, references to virtual link trunking (VLT) herein shall be read generally to mean any of the same or similar technologies regardless of the specific marketing name.

Furthermore, it shall be noted that: (1) certain steps may optionally be performed; (2) steps may not be limited to the specific order set forth herein; (3) certain steps may be performed in different orders; and (4) certain steps may be done concurrently.

A. General Overview

Aspects of the present invention provide more efficient switching of data traffic in networks that include a VLT domain.

In embodiments, when packets arrive at one VLT unit (e.g., Unit 1) via an inter-chassis link (ICL) from a peer VLT unit (e.g., Unit 2) in the VLT domain, the first VLT unit (e.g., Unit 1) checks whether the Media Access Control source address (MAC SA) was learned on a VLT LAG using an Access Control List (ACL) entry. One skilled in the art shall recognize that using an ACL is not the only way to detect that MAC SA was learned on the VLT LAG. Other methods include, but are not limited to, using a sampling table which contains the mapping of incoming port and destination MAC, wherein when any entry in the table gets hit, sampling is done. So, in embodiments, whenever the MAC is learned in the VLT LAG, this sampling table may be populated with the port as ICL and destination MAC address (MAC learnt on VLT LAG). In any event, in embodiments, if the MAC SA was learned on a VLT LAG, flow-based ingress sampling is enabled.

In embodiments, a few sampled packets of the flow are sent to the CPU of Unit 1. At the CPU, the MAC destination address (DA) is interchanged with the MAC SA in a sampled packet, while keeping the virtual local area network (VLAN) identifier as it is in the packet. Also, in embodiments, a reserved ethertype or any other packet field is marked to indicate that this packet is a special packet.

In embodiments, the packet is returned to the Unit 1's network processing unit (NPU) in normal Ethernet mode. As normally done, the Layer 2 L2) table would be looked up and the special packet would be forwarded to the VLT LAG toward the original source device.

Normally, the switched MAC SA would have been learned on the LAG by the VLT termination device. In embodiments, when the special packet arrives at this device, it is recognized as a special packet and it learns the MAC SA on the relevant sub-LAG on which it received the special packet.

In embodiments, to prevent station moves, addresses learned on a sub-LAG may be set to have a higher learning priority if learned on the main LAG.

Once the MAC gets installed on device, the flows are switched to the proper VLT node, thus avoiding the extra hop over the ICL and possibly avoiding congestion on ICL.

In embodiments, for flow identification, when packets are learned on any VLT LAG, a single class ID may be assigned in an L2Table. In embodiments, flows may be identified using a single ACL entry where we match incoming interface as ICL LAG and destination L2class identifier (e.g., class id=10) from the L2table and the action is to sample the packets. It shall be noted that having a class id may be a specific feature to certain chipsets, which may be used for identification of packets learned on a VLT LAG. It shall also be noted that other chips might support other mechanisms to know that a packet is learned on a VLT LAG.

One skilled in the art shall recognize that such a methodology has several advantages. For example, sampling packets from the ICL based on whether the MAC has been learned on a VLT LAG and re-injecting the packets from the CPU after replacing the MAC SA with MAC DA and vice versa is not only novel, but it is also relatively low-cost, computationally. In embodiments, only a few packets are sent to the CPU due to sampling and would not overwhelm the CPU. Furthermore, the CPU does not need to fill a destination port, as those get filled after an L2lookup in the NPU. An additional benefit of the present invention is that it helps avoid congestion on the ICL if many flows travel via the ICL. Also, by avoiding switching traffic onto the ICL, there is at least one extra hop that is avoided—thereby making the overall system faster and more efficient. Yet another advantage of embodiments of the present invention is that it is also applicable when all the links between one of the VLT LAGs and one of the VLT nodes goes down and packets are switched via ICL to be forwarded via the other set of links of the VLT LAG. Concerning aging, it should also be noted that the embodiments of the present invention have an inherent retry mechanism—when aging happens, the packets are sent on the main LAG. If the VLT portchannel has come back up after a failure, the mechanism of the present invention would not kick-in again and entire bandwidth of the main LAG would be utilized. One skilled in the art shall recognize other advantages provided by embodiments of the present invention.

B. Example Methodology Embodiments

Figure 2:
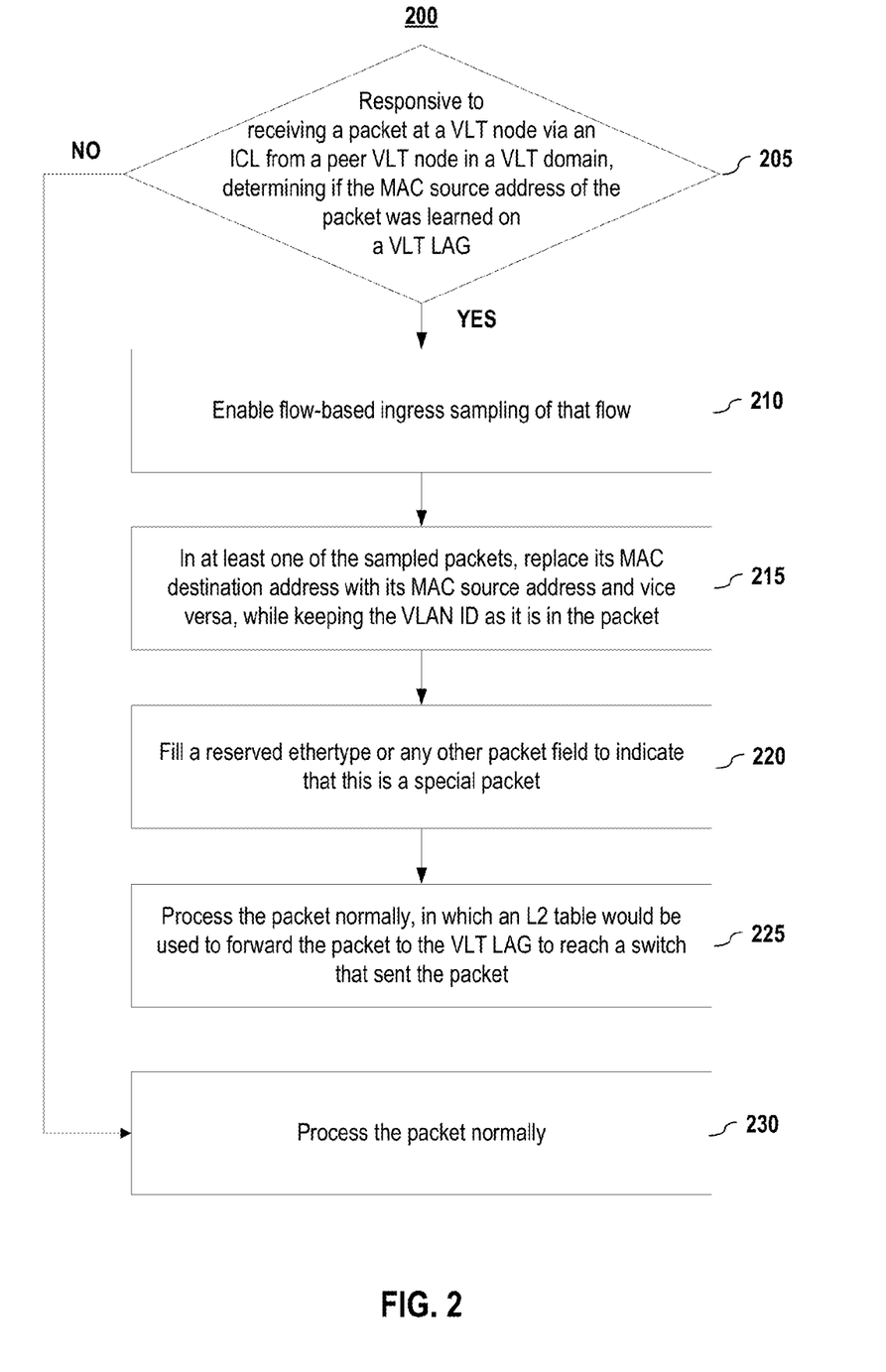
FIG. 2 depicts a method performed by a node in a VLT domain according to embodiments of the present invention.
Figure 3:
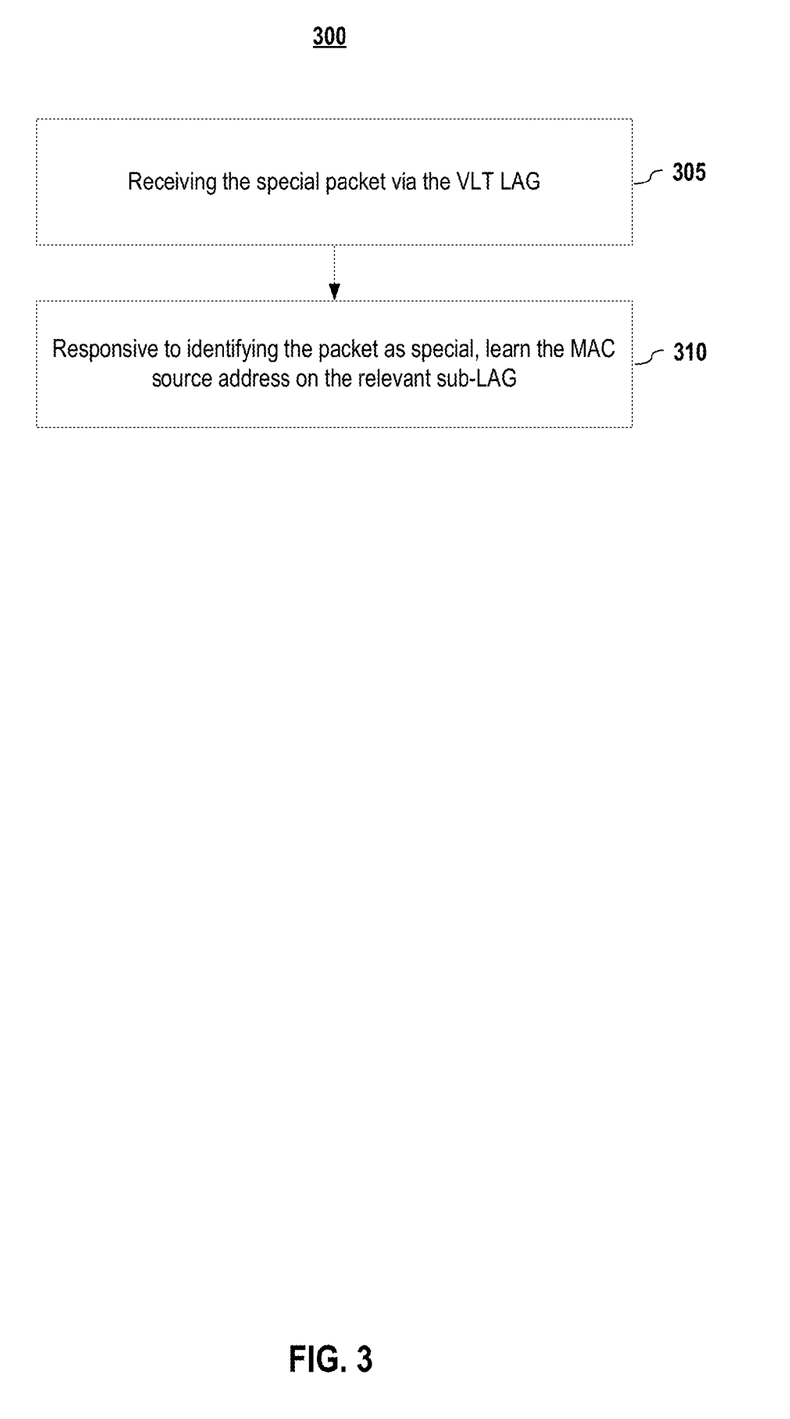
FIG. 3 depicts a method performed by a VLT termination device communicatively coupled to a VLT domain according to embodiments of the present invention.

FIG. 2 depicts a method performed by a node in a VLT domain according to embodiments of the present invention. FIG. 3 depicts a method performed by a switch communicatively coupled to a VLT domain according to embodiments of the present invention. FIGS. 4-7 depict an example system at various stages to help illustrate the example methods of FIG. 2 and FIG. 3.

Figure 4:
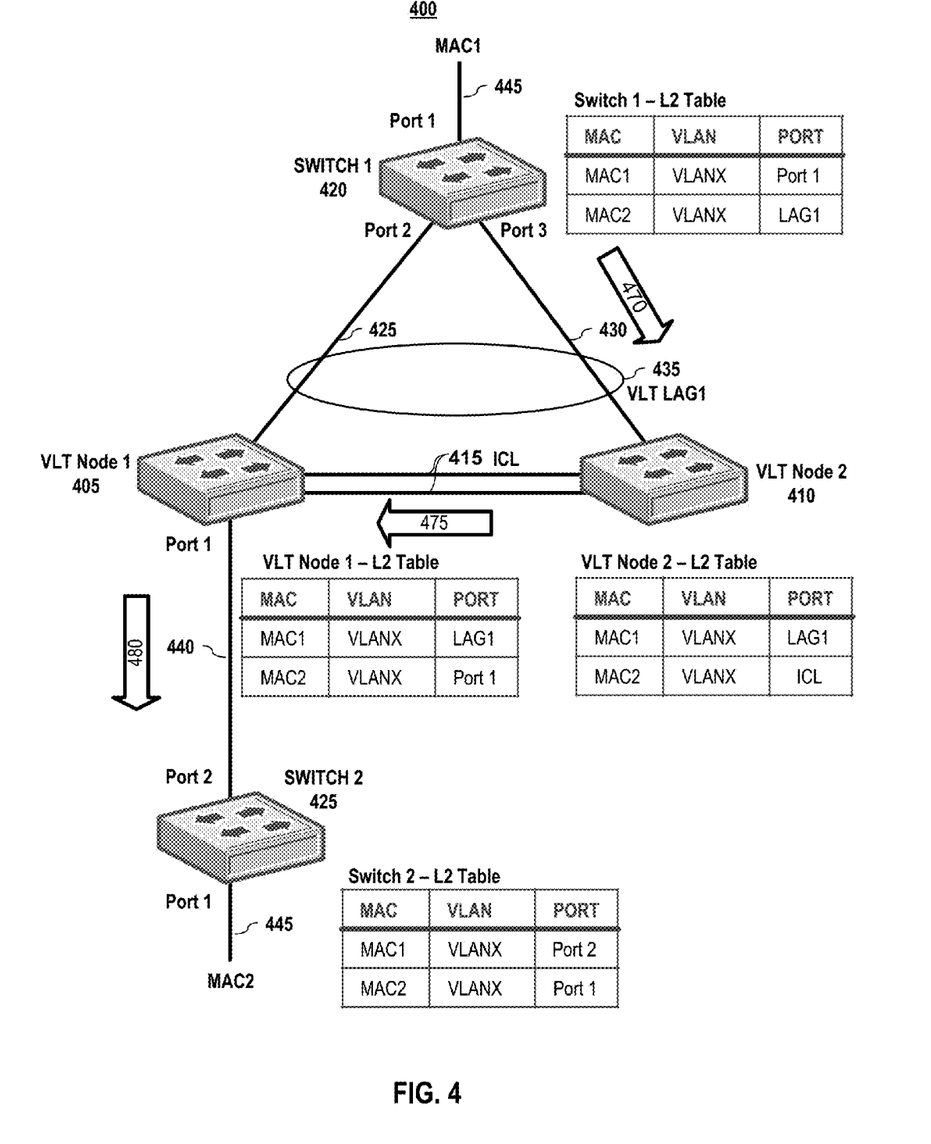
FIGS. 4-6 depict an example system at various stages to help illustrate the example methods of FIG. 2 and FIG. 3, according to embodiments of the present invention.

Consider the networking system 400 depicted in FIG. 4. For purposes of explanation, assume packets from Switch 1 420 to Switch 2 425 have the following packet fields:
MAC SA=MAC1
MAC DA=MAC2
VLAN=VLANX Further assume that packets from Switch 2 to Switch 1 have the following:
MAC SA=MAC2
MAC DA=MAC1
VLAN=VLANX Also, given the configuration of the network 400 in FIG. 4, the Layer 2 (L2) tables for the switches and the VLT nodes will be as follows (which are also depicted in FIG. 4):

| Switch 1 - L2 Table | | |
|---|---|---|
| MAC | VLAN | PORT |
| MAC1 | VLANX | Port 1 |
| MAC2 | VLANX | LAG1 |

| Switch 2 - L2 Table | | |
|---|---|---|
| MAC | VLAN | PORT |
| MAC1 | VLANX | Port 2 |
| MAC2 | VLANX | Port 1 |

| VLT Node 1 - L2 Table | | |
|---|---|---|
| MAC | VLAN | PORT |
| MAC1 | VLANX | LAG1 |
| MAC2 | VLANX | Port 1 |

| VLT Node 2 - L2 Table | | |
|---|---|---|
| MAC | VLAN | PORT |
| MAC1 | VLANX | LAG1 |
| MAC2 | VLANX | ICL (via MAC sync) |

Consider a packet 470 coming from VLT termination device Switch 1 420 on connection 430 to VLT Node 2 410 that has MAC SA=MAC1 and MAC DA=MAC2 and VLAN=VLANX. That packet will arrive at VTL Node 2 and be switched 475 onto the ICL 415 to VLT Node 1. In embodiments, responsive to receiving a packet at a VLT node (e.g., VLT Node 1) via an ICL from a peer unit (e.g., VLT Node 2) in the VLT domain, the node determines (205) whether the MAC source address of the packet was learned on a VLT LAG. In embodiments, this step may be accomplished by an installed Access Control List (ACL) entry to find whether the MAC SA was learned on a VLT LAG for packets arriving on the ICL.

In embodiments, if the MAC SA was not learned on the ICL, the packet may be processed as normal.

However, in embodiments, if the MAC SA was learned on the ICL, ingress sampling is enabled (210) and one or more sample packets of that flow are sent to the node's CPU.

In embodiments, packets are still switched (e.g., packets 480) toward their destination so as not to interrupt the data flow.

Figure 5:
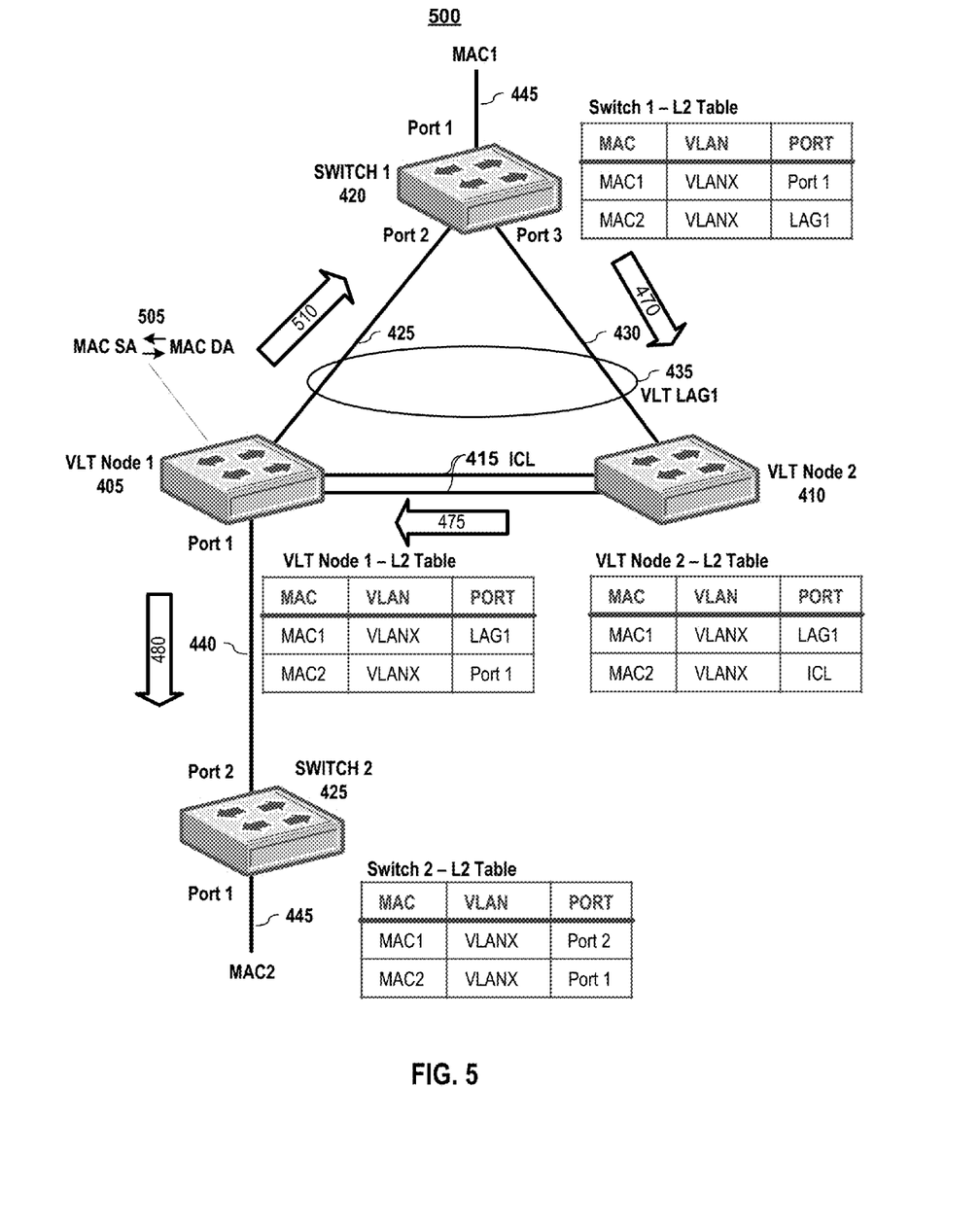

Turning now to FIG. 2 and FIG. 5, in embodiments, for at least one of the sampled packets, its MAC destination address is swapped (215 in FIGS. 2 and 505 in FIG. 5) with its MAC source address, while keeping the VLAN ID as it is in the packet. And, in embodiments, a reserved ethertype or any other packet field is filled (220) to indicate that this is a special packet.

In embodiments, this special packet is injected back to the network processor of VLT 1 so that it can be processed accordingly. That is, in embodiments, this special packet is processed (225 in FIG. 2) as it would normally, in which an L2table of the VLT node is used to forward (510 in FIG. 2) the packet via indicated egress (i.e., the VLT LAG) to reach the VLT termination unit (e.g., Switch 1). That is, the special packet with MAC DA=MAC1 and MAC SA=MAC2 is looked up in the L2table of VLT Node 1 and is forwarded to VLT LAG1.

Figure 6:
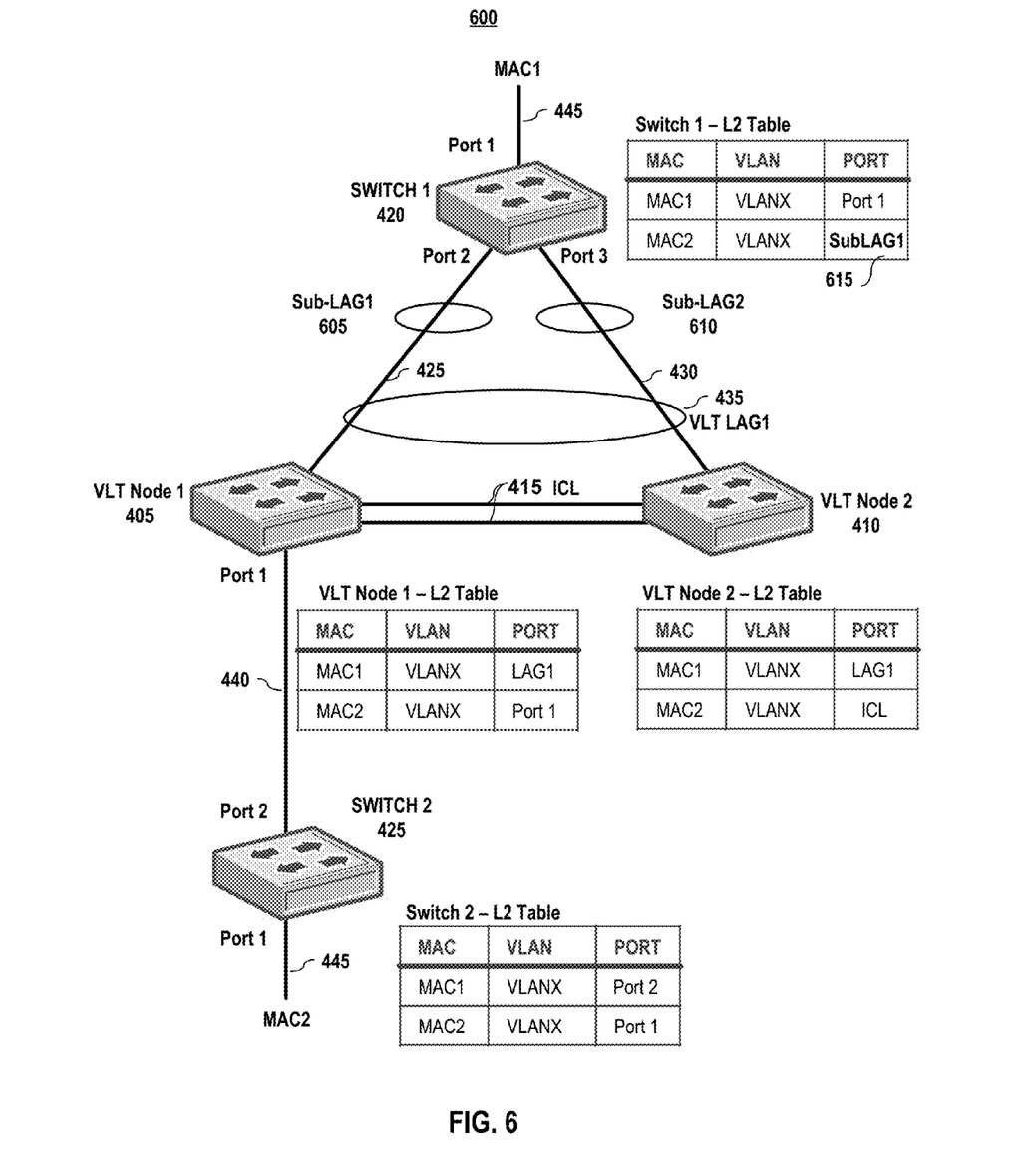

Turning now to FIG. 3 and FIG. 6, Switch 1 420 receives (605) the packet marked as special via the VLT LAG 435. In embodiments, the special packet is identified in Switch 1 420 using an ACL entry. In embodiments, an ACL rule to trap the special packet on the VLT termination device (e.g., Switch 1) may be done at the switch initialization as is done for protocol packets, such as spanning tree protocol (STP), link layer discovery protocol (LLDP), etc.

In embodiments, the special packet are captured and sent to the CPU. In embodiments, the special packet may be matched on the special packet field and can be dropped and copied to the CPU using a single ACL rule. After receiving the special packet, the CPU updates the L2table 615 on Switch 1 based on the special packet and has now learned that MAC SA=MAC2 is on sub-LAG1 605 (rather than generically on parent VLT LAG 1).

In embodiments, the special packet may be identified and the reprogramming of the L2may be done without sending the packet to the CPU. For example, in embodiments, the special packet may be assigned to a specific port which is configured to set the L2programming without being sent to the CPU.

Regardless of the specific implementation, responsive to identifying the packet as special, the original MAC destination address (or swapped MAC SA on the special packet) is learned (610) on the relevant sub-LAG, in this case sub-LAG1 605. In embodiments, a sub-LAG may be formed through different mechanisms, such as through LLDP or LACP protocol extensions or a user may manually configure the sub-LAG.

In embodiments, to avoid station movement of MACs learned on sub-LAGs, a MAC learned from a special packet may be given higher priority using class-based learning. Thus, the same MAC will not be re-learned on the parent LAG.

Figure 7:
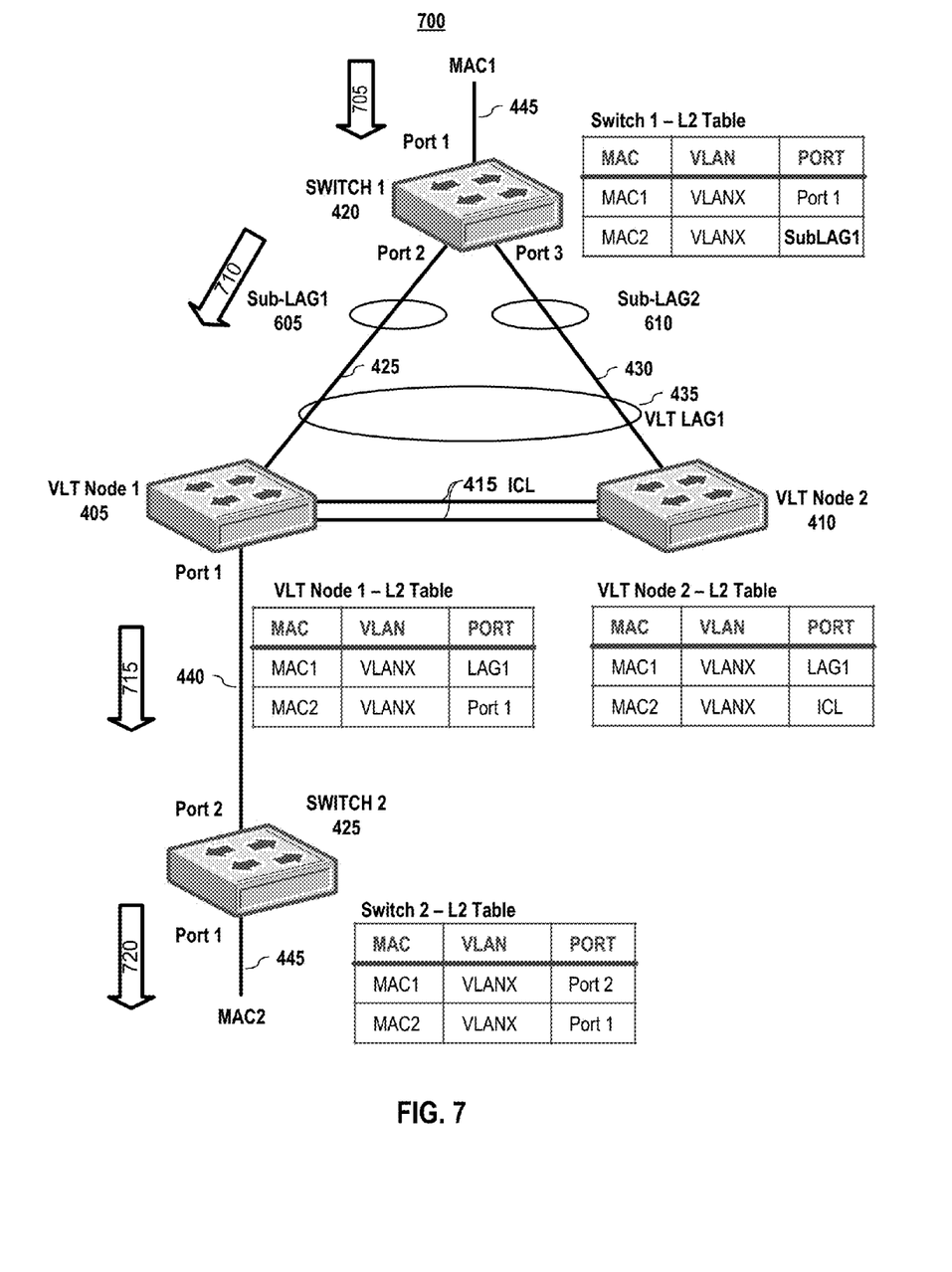
FIG. 7 depicts the improved switching efficiency of the new programming according to embodiments of the present invention.

FIG. 7 depicts the improved switching efficiency of the new programming according to embodiments of the present invention. As shown in FIG. 7, when Switch 1 420 receives a packet 705 that is intended for MAC2, the updated L2table of Switch 1 has the port identified not as the parent LAG, LAG1 435, but rather the sub-LAG, sub-LAG1 605. Since the packet will egress onto sub-LAG1 605, rather than LAG1 435, it cannot be hashed onto the less efficient path 430, which would add an extra hop and require being switched onto the ICL 415. Rather, since it egresses on sub-LAG1, the packet 710 takes the more direct path to VLT Node 1 405 and then 715 to Switch 2 425 (and onward 720 to its destination of MAC2).

C. System Embodiments

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 8:
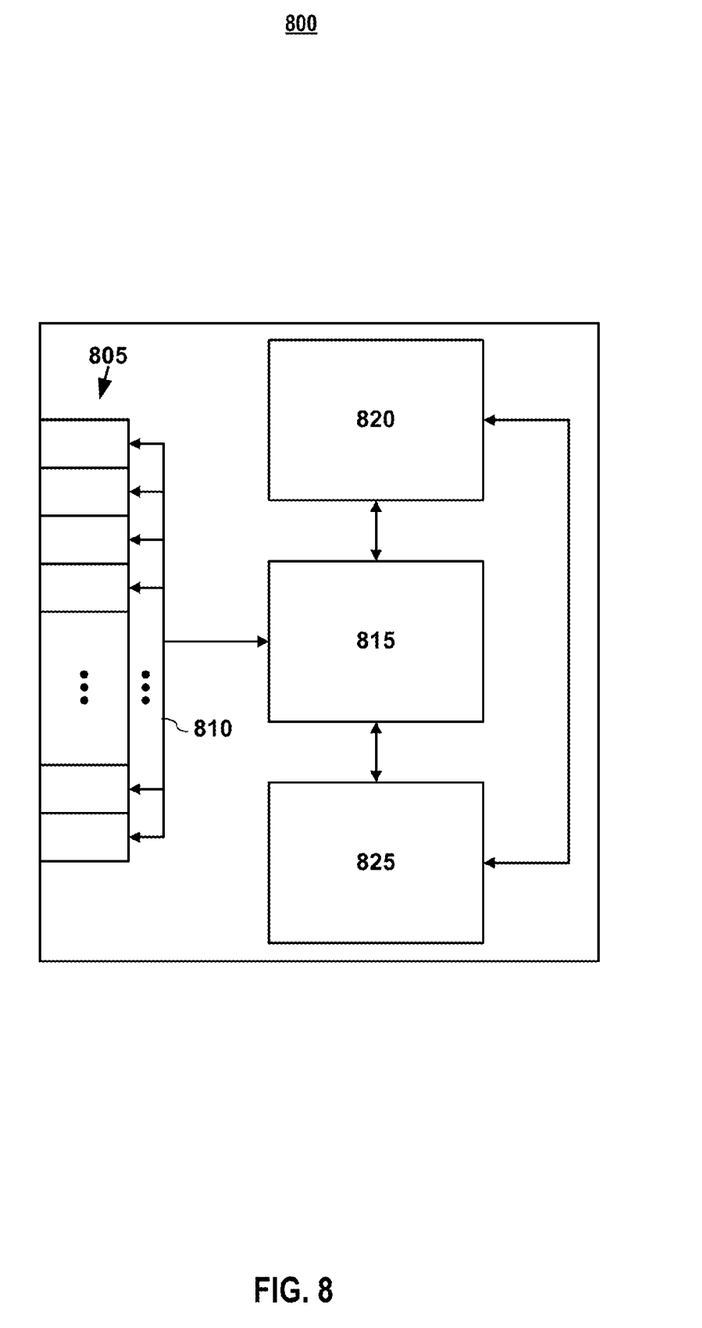
FIG. 8 shows a simplified block diagram of an information handling system according to embodiments of the present invention.

FIG. 8 depicts a simplified block diagram of an information handling system 800 according to embodiments of the present invention. It will be understood that the functionalities shown for device 800 may operate to support various embodiments of an information handling system (or node)—although it shall be understood that an information handling system may be differently configured and include different components. The information handling system 800 may include a plurality of I/O ports 805, a bus 810, a network processing unit (NPU) 815, one or more tables 820, and a central processing unit (CPU) 825. The system includes a power supply (not shown) and may also include other components, which are not shown for sake of simplicity.

In embodiments, the I/O ports 805 may be connected via one or more cables to one or more other network devices or clients. The network processing unit (NPU) 815 may use information included in the network data received at the node 800, as well as information stored in the tables 820, to identify a next hop for the network data, among other possible activities. In embodiments, a switching fabric then schedules the network data for propagation through the node to an egress port for transmission to the next hop.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

One skilled in the art will recognize no particular information handling system, protocol, or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. An information handling system comprising:
    a plurality of input/output (I/O) ports, at least a portion of which are configurable to facilitate communications with one or more devices and configurable to be part of a virtual link trunking (VLT) link aggregation group (LAG), the VLT LAG comprising the information handling system and at least one of the one or more devices;
    at least one inter-node-link (INL) port, which facilitates communication with a peer VLT node in a VLT domain, which comprises the information handling system and the peer VLT node;
    one or more processors that are communicatively coupled to the plurality of I/O ports and the at least one INL port; and
    a non-transitory memory comprising one or more sequences of instructions which, when executed by at least one of the one or more processors, causes steps to be performed comprising:
        responsive to receiving a packet, which is part of a flow, via the at least one INL port from the peer VLT node in the VLT domain, determining whether a media access control (MAC) source address of the packet was learned on the VLT LAG, the packet having been switched to the VLT domain by a VLT termination device;
        responsive to the MAC source address of the packet having been learned on the VLT LAG, enabling ingress sampling of one or more packets of the flow;
        for at least one of the sampled packets, swapping its MAC destination address with its MAC source address while keeping its Virtual Local Area Network (VLAN) identifier (ID) the same;
        marking the at least one sampled packet to indicate that it is a special packet; and
        switching the special packet toward the MAC source address.

2. The information handling system of claim 1 wherein the step of marking the at least one sampled packet to indicate that it is the special packet comprises:
    filling one or more packet fields in the at least one sampled packet to indicate that the at least one sampled packet with the swapped MAC source address and MAC destination address is the special packet.

3. The information handling system of claim 1 wherein the non-transitory memory further comprises one or more sequences of instructions which, when executed by at least one of the one or more processors, causes steps to be performed comprising:
    responsive to the MAC source address of the packet not having been learned on the VLT LAG, processing the packet normally.

4. The information handling system of claim 1 wherein the step of determining whether the media access control (MAC) source address of the packet was learned on the VLT LAG is accomplished by an installed Access Control List (ACL) entry to find whether the MAC source address was learned on the VLT LAG for packets arriving on the INL.

5. The information handling system of claim 1 wherein the step of switching the special packet toward the MAC source address comprises:
    switching the special packet toward the MAC source address via an egress interface as indicated in a layer 2 (L2) table.

6. The information handling system of claim 5 wherein the special packet indicates to the VLT termination device to update its L2 table to learn the MAC destination address of the original packet, which is the MAC source address of the special packet, on a sub-LAG of the VLT LAG.

7. The information handling system of claim 5 wherein the special packet is assigned a higher priority to avoid relearning the MAC destination address on the VLT LAG.

8. An information handling system comprising:
    a plurality of ports for facilitating communications with one or more other information handling systems communicatively coupled to the information handling system, at least one or more of the plurality of ports being configurable to be members of virtual link trunking link aggregation group (VLT LAG) that facilitates communications with one or more VLT nodes of a VLT domain;
    one or more processors that are communicatively coupled to the plurality of ports; and
    a non-transitory memory comprising one or more sequences of instructions which, when executed by at least one of the one or more processors, causes steps to be performed comprising:
        receiving a packet via a VLT sub-LAG that is a subset of the VLT LAG; and
        responsive to identifying the packet as a special packet, learning a MAC source address of the special packet on the sub-LAG from which it was received.

9. The information handling system of claim 8 wherein the step of learning the MAC source address of the special packet on the sub-LAG from which it was received comprises programming the MAC source address and sub-LAG into a Layer 2 table.

10. The information handling system of claim 8 wherein the special packet is assigned a higher priority to avoid relearning the MAC destination address on the VLT LAG.

11. The information handling system of claim 8 wherein the step of identifying the packet as the special packet comprises:
    using an installed Access Control List (ACL) rule.

12. The information handling system of claim 11 wherein the step of using the installed Access Control List (ACL) rule comprises:
    identifying the packet as a special packet based upon one or more marked fields in the packet; and
    sending the special packet to a central processing unit (CPU) from the one or more processors.

13. The information handling system of claim 12 wherein the step of sending the special packet to a central processing unit (CPU) from the one or more processors comprises the steps of:
    capturing the special packet;
    dropping the special packet from normal processing; and
    sending the special packet or a copy of the special packet to the CPU.

14. The information handling system of claim 11 wherein the step of using the installed Access Control List (ACL) rule comprises:

identifying the packet as a special packet based upon one or more marked fields in the packet; and assigning the special packet to a specific port that is configured to set a Layer 2 programming to learn the MAC source address of the special packet on the sub-LAG from which it was received without having to without sent the special packet to the CPU.

15. A method for switching data to a correct node in a Virtual Link Trunking (VLT) domain, the method comprising:

responsive to receiving a packet, which is part of a flow, via an inter-node link between peer VLT nodes in the VLT domain, determining whether a media access control (MAC) source address of the packet was learned on a VLT LAG formed between a plurality of the peer VLT nodes in the VLT domain and a VLT termination device, the packet having been switched to the VLT domain by the VLT termination device;

responsive to the MAC source address of the packet having been learned on the VLT LAG, enabling ingress sampling of one or more packets of the flow;

for at least one of the sampled packets, swapping its MAC destination address with its MAC source address while keeping its Virtual Local Area Network (VLAN) identifier (ID) the same;

marking the at least one sampled packet to indicate that it is a special packet; and switching the special packet toward the MAC source address.

16. The method of claim 15 wherein the step of marking the at least one sampled packet to indicate that it is the special packet comprises:

filling one or more packet fields in the at least one sampled packet to indicate that the at least one sampled packet with the swapped MAC source address and MAC destination address is the special packet.

17. The method of claim 15 further comprising:

responsive to the MAC source address of the packet not having been learned on the VLT LAG, processing the packet normally.

18. The method of claim 15 wherein the step of determining whether the media access control (MAC) source address of the packet was learned on the VLT LAG is accomplished by an installed Access Control List (ACL) entry to find whether the MAC source address was learned on the VLT LAG for packets arriving on the INL.

19. The method of claim 15 wherein the step of switching the special packet toward the MAC source address comprises:

switching the special packet toward the MAC source address via an egress interface as indicated in a layer 2 (L2) table.

20. The method of claim 19 wherein the special packet indicates to the VLT termination device to update its L2 table to learn the MAC destination address of the original packet, which is the MAC source address of the special packet, on a sub-LAG of the VLT LAG.

* * * * *